United States Patent Office
2,938,032
Patented May 24, 1960

2,938,032

PREPARATION OF TRICHLORO-ISOCYANURIC ACID

Robert Hügel and Adolfo Pasetti, Milan, Italy, assignors to Montecatini-Società Generale per l'Industria Mineraria e Chimica, a corporation of Italy No Drawing. Filed Apr. 17, 1958, Ser. No. 729,083

Claims priority, application Italy Apr. 29, 1957

7 Claims. (Cl. 260—248)

This invention relates to an improvement in processes for preparing trichloro-isocyanuric acid.

It is known that, by introducing chlorine into an ice-cooled aqueous solution of 1 mol of cyanuric acid and 3 mols of potassium or sodium hydroxide as a 5% solution (Beilstein 26, 256), trichloro-isocyanuric acid is obtained. In British Patent 634,801 (1950) a yield of 60% is mentioned. U.S.A. Patent 2,607,738 (1952) describes applications of trichloro-isocyanuric acid.

We have found that very pure trichloro-isocyanuric acid can be prepared in nearly quantitative yields by the following process:

A suspension of cyanuric acid and sodium bicarbonate in anhydrous acetone is prepared. A bicarbonate excess of 10% to 20% as compared with the stoichiometric amount is used. Gaseous chlorine is introduced in a slight excess while stirring and cooling the mixture to about 0° C. Trichloro-isocyanuric acid is dissolved as soon as it is formed, while the hydrochloric acid formed is neutralized by the sodium bicarbonate:

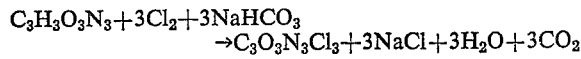

$$C_3H_3O_3N_3 + 3Cl_2 + 3NaHCO_3 \rightarrow C_3O_3N_3Cl_3 + 3NaCl + 3H_2O + 3CO_2$$

When the reaction is completed a drying substance is added eliminating water, the solution is filtered and both the excess chlorine and acetone as well as the acetone reaction products are distilled off under reduced pressure and at a temperature lower than 30° C. It has been demonstrated that under these conditions said acetone reaction products are present in a very limited amount. Acetone reacts at room temperature with trichloro-isocyanuric acid. A violent reaction may take place unless the reaction mixture is chilled. Cooling, preferably to 0° C., permits effective use of acetone, which is a good solvent for trichloro-isocyanuric acid. The residue consists of a white, well-crystallized trichloro-isocyanuric acid, with the theoretical chlorine content and a yield higher than 95%.

Example 1

20 g. cyanuric acid and 78 g. sodium bicarbonate are suspended in 400 g. acetone. 40 g. gaseous chlorine are introduced while stirring and keeping the temperature at 0° C. When the reaction is completed sodium sulfate is added, the mixture is stirred and filtered, the precipitate (consisting only of inorganic salts) is washed with acetone and the filtrate is distilled under reduced pressure at a temperature lower than 30° C. The residue consists of 34 g. of a product containing 45.6% chlorine. The yield is of about 95%.

Example 2

10 g. cyanuric acid and 29.3 g. sodium bicarbonate (molar ratio 1:1.5; bicarbonate excess of 50%) are suspended in 200 g. acetone. 18 g. gaseous chlorine are then added while stirring, and keeping the temperature at 0° C. When the reaction is completed sodium sulfate is added, the mixture is stirred and filtered, the precipitate (consisting of inorganic salts) is washed with acetone and the filtrate is distilled under reduced pressure at a temperature lower than 30° C. The product is left as the residue. Yield 95.8%.

Example 3

10 g. cyanuric acid and 21.48 g. sodium bicarbonate (molar ratio 1:3.3; bicarbonate excess 10%) are suspended in 200 g. acetone. 18 g. gaseous chlorine are introduced while stirring and keeping the temperature at 0° C. The operation is carried out as in the preceding example. Yield 90.2%.

It is to be understood that for the above outlined process the sodium or potassium carbonates or bicarbonates can be used.

We claim:

1. A process for preparing trichlorocyanuric acid, characterized in that cyanuric acid is suspended in anhydrous acetone together with a 10% to 20% alkali bicarbonate excess over the molar ratio of cyanuric acid to sodium bicarbonate of 1:3, chlorine is introduced while stirring at about 0° C., the mixture is dried and filtered and the filtrate is distilled under reduced pressure, thus obtaining trichloro-isocyanuric acid as the residue.

2. A process of preparing trichlorocyanuric acid, comprising contacting cyanuric acid with chlorine and sodium bicarbonate in substantially anhydrous acetone while cooling to about 0° C.

3. A process of preparing trichlorocyanuric acid, comprising contacting cyanuric acid with chlorine and sodium bicarbonate in substantially anhydrous acetone while chilling below room temperature to minimize reaction of the acetone.

4. A process of preparing trichlorocyanuric acid, comprising contacting cyanuric acid with chlorine and a bicarbonate of an alkali taken from the group consisting of sodium and potassium in substantially anhydrous acetone while cooling below room temperature, adding a dehydrating agent after completion of the reaction, and distilling off the acetone and acetone reaction products under reduced pressure.

5. A process of preparing trichlorocyanuric acid, comprising contacting cyanuric acid with chlorine and a carbonate of an alkali taken from the group consisting of sodium and potassium in substantially anhydrous acetone while cooling to about 0° C.

6. A process of preparing trichlorocyanuric acid, comprising contacting cyanuric acid with chlorine and an alkali taken from the group consisting of sodium and potassium carbonates and bicarbonates in substantially anhydrous acetone while chilling below room temperature.

7. A process for preparing trichlorocyanuric acid, characterized in that cyanuric acid is suspended in anhydrous acetone together with a 10% to 20% alkali bicarbonate excess over the molar ratio of cyanuric acid to sodium bicarbonate of 1:3, chlorine is introduced, the reaction mixture is chilled below room temperature to minimize reaction of the acetone, the mixture is dried and filtered and the filtrate is distilled under reduced pressure, thus obtaining trichloro-isocyanuric acid as the residue.

References Cited in the file of this patent

UNITED STATES PATENTS

| | | |
|---|---|---|
| 2,184,888 | Muskat et al. | Dec. 26, 1939 |
| 2,828,308 | Lorenz | Mar. 25, 1958 |